US011623292B2

(12) United States Patent
Fleming et al.

(10) Patent No.: US 11,623,292 B2
(45) Date of Patent: Apr. 11, 2023

(54) REAL TIME RESISTANCE MONITORING OF AN ARC WELDING CIRCUIT

(71) Applicant: Lincoln Global, Inc., Santa Fe Springs, CA (US)

(72) Inventors: Daniel P. Fleming, Painesville, OH (US); Judah B. Henry, Painesville, OH (US); Jonathon C. Kelm, Willoughby, OH (US); Edward D. Hillen, Painesville, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 440 days.

(21) Appl. No.: 16/585,776

(22) Filed: Sep. 27, 2019

(65) Prior Publication Data

US 2020/0306859 A1 Oct. 1, 2020

Related U.S. Application Data

(60) Provisional application No. 62/826,323, filed on Mar. 29, 2019.

(51) Int. Cl.
*B23K 9/04* (2006.01)
*B23K 9/095* (2006.01)
(Continued)

(52) U.S. Cl.
CPC ........... *B23K 9/04* (2013.01); *B23K 9/091* (2013.01); *B23K 9/1006* (2013.01); *B23K 9/0953* (2013.01)

(58) Field of Classification Search
CPC ........ B23K 9/04; B23K 9/091; B23K 9/1006; B23K 9/0953
(Continued)

(56) References Cited

U.S. PATENT DOCUMENTS 3,054,884 A * 9/1962 Peterson .............. B23K 9/092
315/207
4,546,234 A 10/1985 Ogasawara et al.
(Continued)

FOREIGN PATENT DOCUMENTS

EP 1 027 951 A1 8/2000
EP 2 444 191 A2 4/2012
(Continued)

OTHER PUBLICATIONS

Extended European Examination Report from Corresponding Application No. EP20163893.9; dated Sep. 7, 2020; pp. 1-8.

*Primary Examiner* — Geoffrey S Evans
(74) *Attorney, Agent, or Firm* — Brad C. Spencer

(57) ABSTRACT

A welding or additive manufacturing power supply includes output circuitry configured to generate a welding waveform, a current sensor for measuring a welding current generated by the output circuitry, a voltage sensor for measuring an output voltage of the welding waveform, and a controller operatively connected to the output circuitry to control the welding waveform, and operatively connected to the current sensor and the voltage sensor to monitor the welding current and the output voltage. A portion of welding waveform includes a controlled change in current from a first level to a second level different from the first level. The controller is configured to determine a circuit inductance from the output voltage and the controlled change in current, and further determine a change in resistance of a consumable electrode in real time based on the circuit inductance.

30 Claims, 8 Drawing Sheets

(51) Int. Cl.
*B23K 9/09* (2006.01)
*B23K 9/10* (2006.01)

(58) Field of Classification Search
USPC .................. 219/76.11–76.14, 76.16, 121.11, 219/121.34–121.38, 121.45–121.46, 219/130.01–130.51
See application file for complete search history.

(56) References Cited

U.S. PATENT DOCUMENTS

| | | | |
|---|---|---|---|
| 4,721,947 | A | 1/1988 | Brown |
| 4,954,691 | A | 9/1990 | Parks et al. |
| 5,043,557 | A | 8/1991 | Tabata et al. |
| 5,148,001 | A | 9/1992 | Stava |
| 5,406,045 | A | 4/1995 | Kiriishi et al. |
| 5,571,431 | A | 11/1996 | Lantieri et al. |
| 5,734,147 | A | 3/1998 | Bunker et al. |
| 6,002,104 | A | 12/1999 | Hsu |
| 6,359,258 | B1 | 3/2002 | Blankenship et al. |
| 6,441,342 | B1 | 8/2002 | Hsu |
| 6,596,970 | B2 | 7/2003 | Blankenship et al. |
| 6,710,297 | B1 | 3/2004 | Artelsmair et al. |
| 6,730,875 | B2 | 5/2004 | Hsu |
| 6,849,828 | B2 | 2/2005 | Aigner |
| 6,995,338 | B2 | 2/2006 | Hutchinson |
| 7,072,774 | B1 | 7/2006 | Houston |
| 7,645,960 | B2 | 1/2010 | Stava |
| 7,683,290 | B2 | 3/2010 | Daniel et al. |
| 8,389,897 | B2 | 3/2013 | Sardy et al. |
| 8,546,726 | B2 | 10/2013 | Vogel |
| 9,095,921 | B2 | 8/2015 | Peters et al. |
| 9,387,550 | B2 | 7/2016 | Davidson et al. |
| 9,506,958 | B2 | 11/2016 | Davidson et al. |
| 9,969,024 | B2 | 5/2018 | Denis |
| 10,071,434 | B2 | 9/2018 | Chantry et al. |
| 10,118,243 | B2 | 11/2018 | Peters et al. |
| 2002/0113045 | A1 | 8/2002 | Blankenship et al. |
| 2004/0069759 | A1 | 4/2004 | Davidson et al. |
| 2004/0232129 | A1 | 11/2004 | Houston et al. |
| 2005/0133488 | A1 | 6/2005 | Blankenship et al. |
| 2005/0279819 | A1 | 12/2005 | Stava |
| 2007/0051714 | A1* | 3/2007 | Ou .................. B23K 9/1043 219/130.21 |
| 2007/0056942 | A1 | 3/2007 | Daniel et al. |
| 2007/0262064 | A1 | 11/2007 | Daniel et al. |
| 2008/0083705 | A1 | 4/2008 | Peters |
| 2008/0264916 | A1 | 10/2008 | Nagano et al. |
| 2009/0184098 | A1 | 7/2009 | Daniel et al. |
| 2010/0065539 | A1 | 5/2010 | Daniel et al. |
| 2010/0126976 | A1 | 5/2010 | Kawamoto et al. |
| 2010/0288735 | A1 | 11/2010 | Schmitt et al. |
| 2010/0308026 | A1 | 12/2010 | Vogel |
| 2010/0308027 | A1 | 12/2010 | Vogel |
| 2012/0097655 | A1* | 4/2012 | Daniel ................. B23K 9/0956 219/130.21 |
| 2013/0306610 | A1 | 11/2013 | Chantry et al. |
| 2014/0131320 | A1* | 5/2014 | Hearn .................... B23K 9/092 219/74 |
| 2015/0283652 | A1* | 10/2015 | Pfeifer ................. B23K 9/0953 219/130.21 |
| 2015/0343549 | A1* | 12/2015 | Henry ................... B23K 9/091 219/130.51 |
| 2016/0175971 | A1 | 6/2016 | Denis |
| 2017/0072498 | A1 | 3/2017 | Davidson et al. |
| 2018/0036824 | A1* | 2/2018 | Peters ................. B23K 9/1006 |
| 2018/0050410 | A1 | 2/2018 | Mehn et al. |
| 2018/0111216 | A1 | 4/2018 | Chantry et al. |
| 2018/0141149 | A1* | 5/2018 | Hutchison ............ G05B 19/042 |
| 2018/0257161 | A1 | 9/2018 | Anders et al. |
| 2018/0257162 | A1 | 9/2018 | Johnson et al. |
| 2018/0297139 | A1 | 10/2018 | Chantry et al. |
| 2019/0030633 | A1 | 1/2019 | Zwayer |

FOREIGN PATENT DOCUMENTS

| | | |
|---|---|---|
| EP | 3 398 707 A1 | 11/2018 |
| JP | S53-2426 A | 1/1978 |
| JP | S53-51425 A | 5/1978 |
| JP | S58-71466 A | 4/1983 |
| JP | S60-68164 A | 4/1985 |
| JP | S60-68165 A | 4/1985 |
| JP | S61-111770 A | 5/1986 |
| JP | S64-75176 A | 3/1989 |
| JP | H09-262670 A | 7/1997 |
| JP | 2001-030072 A | 2/2001 |
| JP | 2001-212669 A | 8/2001 |
| JP | 2001-276971 A | 10/2001 |
| WO | 2007/132362 A2 | 11/2007 |
| WO | 2008/140398 A1 | 11/2008 |
| WO | 2010/141435 A2 | 12/2010 |
| WO | 2013/054182 A1 | 4/2013 |

* cited by examiner ial Patent Application Ser. No. 62/826,323 filed on Mar. 29, 2019, the disclosure of which is incorporated herein by reference.

REAL TIME RESISTANCE MONITORING OF AN ARC WELDING CIRCUIT

CROSS-REFERENCE TO RELATED APPLICATIONS

The present application claims priority to U.S. Provisional Patent Application Ser. No. 62/826,323 filed on Mar. 29, 2019, the disclosure of which is incorporated herein by reference.

BACKGROUND OF THE INVENTION

Field of the Invention

The present invention relates to power supplies for generating electrical arcs used in welding or welding-type processes, such as metal additive manufacturing.

Description of Related Art

Welding power supplies can generate complex welding waveforms with very fast output current changes. Such complex welding waveforms are typically controlled based on voltage and/or current feedback measurements. The feedback measurements can be made by the welding power supply, or by a welding wire feeder that is local to the workpiece being welded but is more remote from the welding power supply. Long lengths of welding cable extending from the power supply can add significant inductance, and thus impedance, to the welding circuit. When long welding cables are used, the performance of the power supply may be limited, and accurate feedback measurements become more difficult. The welding power supply can make remote feedback measurements over dedicated sense leads that extend to the workpiece; however, such sense leads increase system complexity and cost, and tend to be fragile and easily broken. Thus, the use of sense leads is generally not desired. The welding wire feeder can make the remote feedback measurements; however, measurement data must then be communicated back to the welding power supply quickly for it to be of use. Such feedback communications require additional circuitry and possibly additional control wiring between the power supply and wire feeder. The feedback communications may occur over the welding cables, but there tends to be a significant amount of noise along the welding cables which must be accommodated. It would be desirable for the welding power supply to accurately determine welding conditions occurring remotely at the workpiece, in real time, even when the welding circuit includes a significant amount of inductance due to long cable lengths, without the need for dedicated sense leads or voltage/current feedback data from the welding wire feeder.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing power supply. The power supply includes output circuitry configured to generate a welding waveform, a current sensor for measuring a welding current generated by the output circuitry, a voltage sensor for measuring an output voltage of the welding waveform, and a controller operatively connected to the output circuitry to control the welding waveform, and operatively connected to the current sensor and the voltage sensor to monitor the welding current and the output voltage. A portion of welding waveform includes a controlled change in current from a first level to a second level different from the first level. The controller is configured to determine a circuit inductance from the output voltage and the controlled change in current, and further determine a change in resistance of a consumable electrode in real time based on the circuit inductance.

In accordance with another aspect of the present invention, provided is a welding or additive manufacturing system. The system includes a consumable electrode, a torch, a wire feeder that advances the consumable electrode through the torch during a deposition operation, and a power supply operatively connected to the wire feeder and the torch through at least one cable. The power supply is configured to provide a series of welding waveforms to the torch to generate a welding current in the consumable electrode. A portion of an individual welding waveform of said series of welding waveforms includes a controlled change in current from a first level to a second level different from the first level. The power supply is configured to determine a circuit inductance based on voltage and current measurements made during the controlled change in current. The power supply is further configured to determine a change in resistance of the consumable electrode in real time based on the circuit inductance.

In accordance with another aspect of the present invention, provided is a welding or additive manufacturing power supply. The power supply includes output circuitry configured to generate a welding waveform, a current sensor for measuring a welding current generated by the output circuitry, a voltage sensor for measuring an output voltage of the welding waveform, and a controller operatively connected to the output circuitry to control the welding waveform, and operatively connected to the current sensor and the voltage sensor to monitor the welding current and the output voltage. A portion of welding waveform includes a controlled change in current from a first level to a second level different from the first level. The controller is configured to determine a circuit inductance in real time during a deposition operation from at least the controlled change in current, and further determine a change in resistance of a consumable electrode in real time based on the circuit inductance.

The power supply or controller can be configured to determine a circuit impedance in real time from the welding current and the output voltage. The controlled change in current can occur during a current ramp portion of the welding waveform. The power supply or the controller can be configured to determine clearance of a short circuit event based on the change in resistance of the consumable electrode. The power supply or the controller can be configured to determine a change in electrode stickout distance based on the change in resistance of the consumable electrode. The power supply can include an output switch, and a resistor connected in parallel with the output switch, and the welding waveform can include a minimum current portion, a pinch current portion during a short circuit event between the consumable electrode and a workpiece, a plasma boost pulse portion, and a tail out from the plasma boost pulse portion to a background current level, and the power supply/controller can be configured to deactivate the output switch to implement the minimum current portion of the welding waveform based on the change in resistance of the consumable electrode. The power supply/controller can be configured to compare the change in resistance of the consumable electrode to a threshold value and deactivate the output switch when the change in resistance of the consumable electrode meets or exceeds the threshold value. The power supply/controller can be configured to compare the circuit inductance to a threshold value and control reactivation of the output switch based on a result of comparing the circuit inductance to the threshold value. In certain embodiments, the pinch current portion of the welding waveform can include a constant current portion from which the power supply/controller determines a baseline circuit resistance. The power supply/controller can be configured to adjust a welding waveform parameter based on the circuit inductance or the baseline circuit resistance. The welding waveform parameter can be a welding current ramp rate and/or an average welding voltage.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
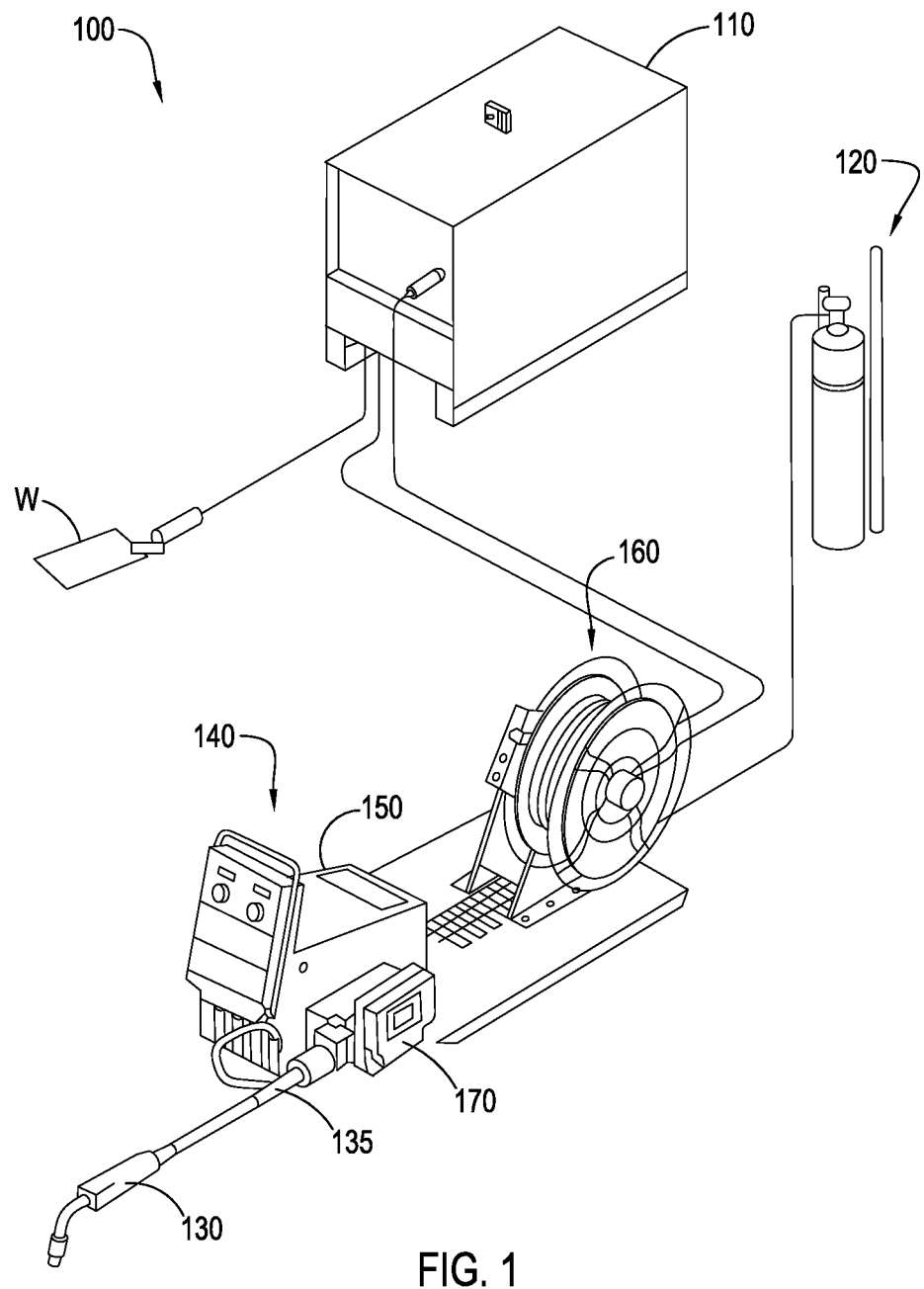
FIG. 1 is a perspective view of a welding system.

Exemplary embodiments of the invention will now be described below by reference to the attached figures. The described exemplary embodiments are intended to assist the understanding of the invention, and are not intended to limit the scope of the invention in any way. Like reference numerals refer to like elements throughout.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of GMAW type welding, other embodiments of the invention are not limited thereto. For example, embodiments can be utilized in SAW and FCAW type welding operations, as well as other similar types of deposition operations. Further, embodiments of the present invention can be used in manual, semi-automatic and robotic welding operations. Embodiments of the present invention can also be used in metal deposition operations that are similar to welding, such as additive manufacturing, hardfacing, and cladding. As used herein, the term "welding" is intended to encompass all of these technologies as they all involve material deposition to either join or build up a workpiece. Therefore, in the interests of efficiency, the term "welding" is used below in the description of exemplary embodiments, but is intended to include all of these material deposition operations, whether or not joining of multiple workpieces occurs.

FIG. 1 illustrates an exemplary embodiment of an arc welding system 100. The system 100 includes a welding power supply 110, a welding wire feeder 140, a welding wire source 160, a gas source 120, and a welding torch or gun 130. The wire feeder 140 includes a controller 150 and a wire gripping device 170. The controller 150 may include a motor (not shown) that drives the wire gripping device 170 to pull a welding wire electrode from the welding wire source 160 (e.g., spool, drum, etc.) through the wire gripping device 170 and into the welding gun 130 via a welding cable 135. Such welding systems are well known in the art. A first electrical terminal or output stud of the welding power supply 110 may be connected to a workpiece W such that the welding wire electrode, which is electrically connected to a second electrical terminal or output stud of the welding power supply, may be applied to the workpiece W via the welding gun 130 to produce a weld in an arc welding operation.

Figure 2:
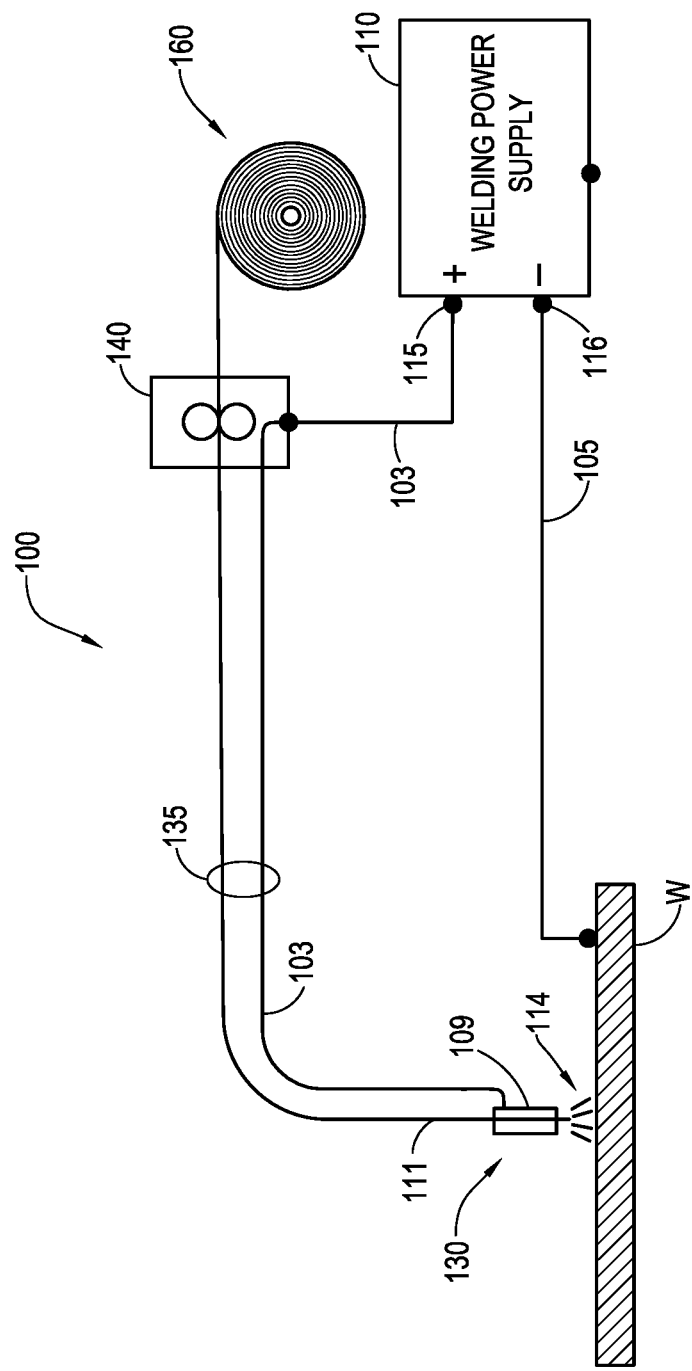
FIG. 2 is a is a schematic diagram of the welding system.

FIG. 2 provides a schematic diagram of the arc welding system 100. The power supply 110 provides a welding signal or welding waveform through welding leads 103 and 105 to the workpiece W. The welding signal has a current and a voltage, and can be a type of welding signal that requires a change in current from one level to another. For example, the signal can be a pulse welding signal which changes from a background to a peak level during welding, or an alternating polarity waveform that changes from one polarity to the other at a known rate. The current from the power supply 110 is delivered to an electrode 111 via a contact tip 109 to generate an arc 114 between the electrode 111 and the workpiece W. As is common in GMAW welding operations, the positive lead 103 can be coupled to a wire feeder 140 which then passes the welding current through a welding cable 135 to the contact tip 109. In such a configuration the overall length of the positive lead 103 is a combination of the connection from the power supply 110 to the wire feeder 140 and from the wire feeder to the contact tip 109. Of course the lead 103 can be coupled directly to the contact tip 109. The power supply 110 can include terminals or output studs 115, 116 that connect the welding leads 103, 105 to the electrical output of the power supply.

Figure 3:
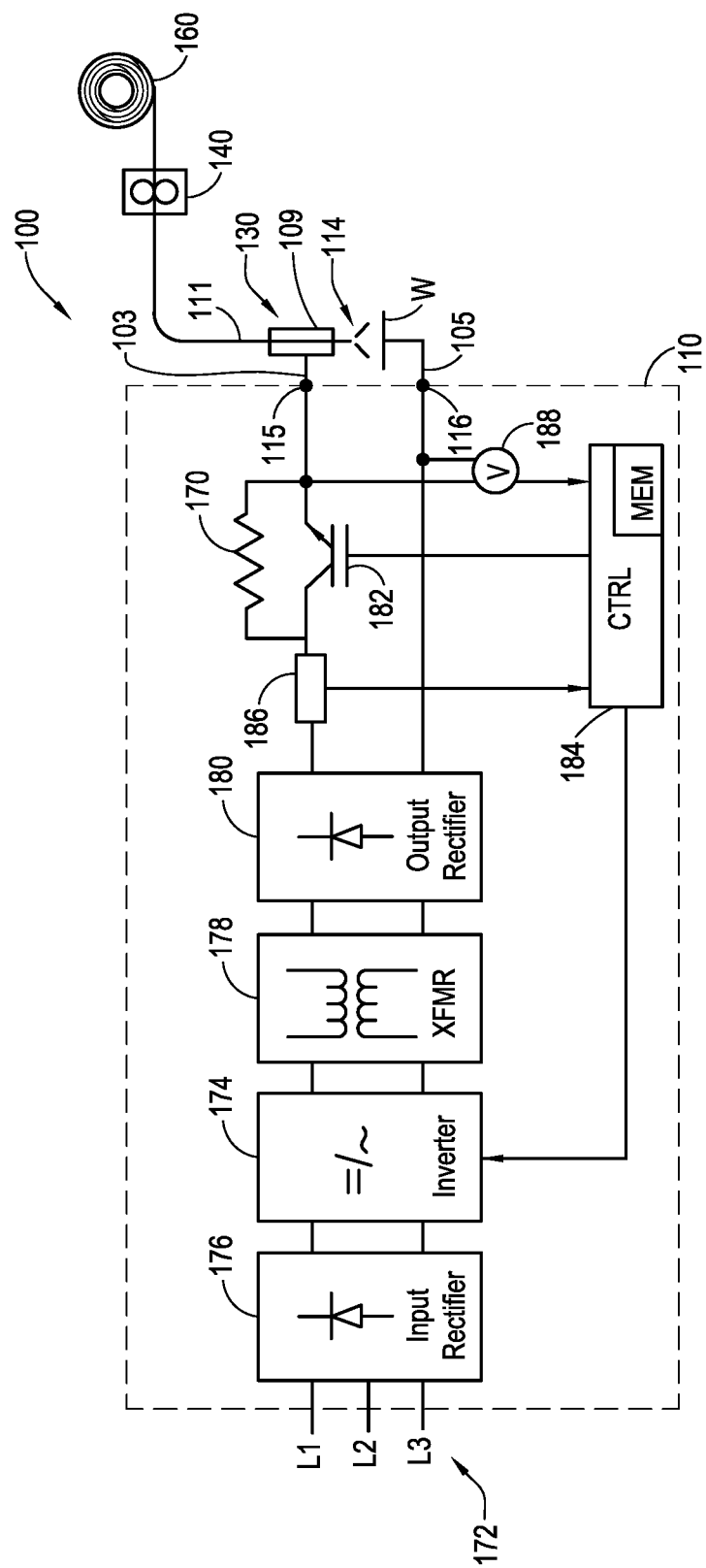
FIG. 3 is a schematic diagram of the welding system.

FIG. 3 provides another schematic diagram of the arc welding system 100 with additional details of the power supply 110 illustrated. The power supply 110 receives electrical energy for generating the arc 114 from a power source 172, such as a commercial power source or a generator. The power source 172 can be a single phase or three phase power source. In certain embodiments, the arc welding system 100 can be a hybrid system that includes one or more batteries (not shown) that also supply energy to the welding power supply 110. The power supply 110 includes output circuitry for supplying the welding waveforms to the contact tip 109 and electrode 111. The output circuitry can include a switching type power converter such as an inverter 174 for generating the arc 114 according to a desired welding waveform. Alternatively or additionally, the welding power supply could include a DC chopper (not shown) or boost converter (not shown) for generating welding waveforms. AC power from the power source 172 is rectified by an input rectifier 176. The DC output from the rectifier 176 is supplied to the inverter 174. The inverter 174 supplies high-frequency AC power to a transformer 178, and the output of the transformer is converted back to DC by an output rectifier 180.

Current from the output circuitry flows to the contact tip 109 and to the electrode 111 and workpiece W to generate the arc 114. The welding current from the output rectifier 180 can flow through either a controllable output switch 182 or a resistor 170. Deactivating the output switch 182 will quickly reduce the welding current by forcing it through the resistor 170. The output switch 182 and resistor 170 can be used to reduce spatter at specific points during welding by quickly reducing the welding current. For example, when conducting a surface tension transfer STT or a short-arc welding operation, the welding current can be rapidly brought to a low current level when a short circuit event between the welding electrode 111 and workpiece W occurs and/or is about to break, by selectively deactivating the output switch 182. It can be seen that the resistor 170 is connected in parallel with the output switch 182. When the output switch 182 is in the on or activated state, the welding current flows through the output switch to the torch 130 and electrode 111. When in the on state, the output switch 182 effectively shorts out the resistor 170. When the output switch 182 is in an off or deactivated state, the resistor 170 is connected in series with the torch 130 and electrode 111, and the welding current flows through the resistor. In certain embodiments, the resistor 170 can be adjustable to control the magnitude of the low current level.

The welding torch 130 is operatively connected to the power supply 110. The power supply 110 supplies welding output electrical energy to the welding torch 130 to generate the arc 114 and perform the deposition operation (e.g., welding, additive manufacturing, hardfacing, etc.) The torch 130 can have a contact tip 109 for transferring the electrical energy supplied by the power supply 110 to the electrode 111. The electrode 111 can be a solid, flux-cored or metal-cored consumable wire welding electrode. The electrode 111 can be fed from the welding wire source 160 by the wire feeder 140, which advances the electrode toward a weld puddle during the welding operation. As shown schematically in FIG. 3, the wire feeder 140 can include motor-operated pinch rollers for driving the electrode 111 toward the torch 130.

The arc welding system 100 can be configured for direct current electrode positive (DC+) or "reverse" polarity wherein the contact tip 109 and electrode 111 are connected to a positive lead from the power supply 110, and the workpiece W is connected to a negative lead. Alternatively, the arc welding system 100 can be configured for direct current electrode negative (DC−) or "straight" polarity, wherein the workpiece W is connected to the positive lead and the contact tip 109 and electrode 111 are connected to the negative lead. Further, the arc welding system 100 can be configured for AC welding in which AC waveforms are provided to the contact tip 109, electrode 111 and workpiece W.

The power supply 110 includes a controller 184 operatively connected to the output circuitry, such as to the inverter 174, for controlling the welding waveforms generated by the power supply. The controller 184 can provide a waveform control signal to the inverter 174 to control its output. The controller 184 controls the output of the inverter 174 via the waveform control signal, to achieve a desired welding waveform, welding voltage, welding current, etc. The waveform control signal can comprise a plurality of separate control signals for controlling the operation of various switches (e.g., transistor switches) within the inverter 174. The controller 184 is also operatively connected to the output switch 182 to control its switching operations between the on, activated state and the off, deactivated state. The controller 184 monitors aspects of the welding process via feedback signals. For example, a current sensor 186, such as a current transformer (CT) or shunt, can provide a welding current feedback signal to the controller 184, and a voltage sensor 188 can provide a welding voltage feedback signal to the controller. The current sensor 186 and voltage sensor 188 are located at the power supply 110, which may be remote from the workpiece W and arc 114. However, as will be discussed further below, the controller 184 can monitor conditions of the welding process, and in particular conditions occurring remotely at the workpiece W, from voltage and current measurements made at the output studs 115, 116 of power supply 110 by the voltage and current sensors.

The controller 184 can be an electronic controller and may include a processor. The controller 184 can include one or more of a microprocessor, a microcontroller, a digital signal processor (DSP), an application specific integrated circuit (ASIC), a field-programmable gate array (FPGA), discrete logic circuitry, or the like. The controller 184 can include a memory portion (e.g., RAM or ROM) storing program instructions that cause the controller to provide the functionality ascribed to it herein. The controller 184 can include a plurality of physically separate circuits or electronic devices, such as a processor in combination with separate comparators, logic circuits, etc. However, for ease of explanation, the controller 184 is shown as a monolithic device.

With reference to FIGS. 2 and 3, the welding leads 103 and 105 can be quite long as the workpiece W can be positioned far away from the power supply 110. For example, in some instances the leads 103/105 can have a length of 100 feet or longer. Such long cable lengths can significantly increase the inductance of the welding circuit and negatively affect the ability of the power supply 110 to determine the conditions at the workpiece, such as the arc voltage, electrode "stickout" length from the contact tip, arc length, whether a short circuit is about to clear, etc. The conditions at the workpiece may require adjustments to be made to the welding waveform or to other welding parameters, and the ability of the power supply to timely and correctly make such adjustments can be impaired by long cable lengths. For example, a large cable inductance (e.g., 35 μH or greater) can negatively affect the ability of the power supply 110 to determine if a short circuit between the electrode 111 and workpiece W is about to clear, to determine changes to electrode "stickout", to determine welding path adjustments during through-arc seam tracking (TAST), etc. Further, it may be desirable to adjust some welding parameters when the inductance and/or resistance of the welding circuit is large. Examples of such parameters include the average output voltage or a "trim" setting on the welding power supply 110, or ramp rates of a welding current waveform. If the welding cables are long, the corresponding increase in inductance and resistance in the welding circuit may be accommodated or offset by increasing the average welding voltage (e.g., increasing the trim setting) to maintain a proper arc length and energy level supplied to the weld. Welding current ramp rates can be reduced when the welding cables are long. In more extreme circumstances, if the welding cables are too long or add too much inductance to the welding circuit, such as when the cables are long and coiled, it can be desirable to instruct an operator to take remedial action via an alarm. The power supply 110 discussed herein can determine the conditions at the workpiece from measurements made remotely at the power supply, taking into account the inductance of the welding circuit. In certain embodiments, the power supply 110 can determine cable inductance prior to or during welding, and determine the total impedance and the inductive reactance of the welding circuit in real time. Using this information, the power supply 110 can transform the total impedance of the welding circuit into a compensated resistance that includes the resistance of the welding electrode at the workpiece. The power supply 110 can then use the compensated resistance to determine conditions at the workpiece in real time, such as the point in time when a short circuit between the electrode and workpiece is about to clear, and respond to such conditions (e.g., by reducing the welding current to minimize spatter). Further, the power supply 110 can use the measured or estimated cable inductance and/or compensated resistance to, among other things, make parameter adjustments, perform seam tracking, determine the amount of power supplied to the arc, help classify weld quality, generate various alarms, etc.

Figure 4:
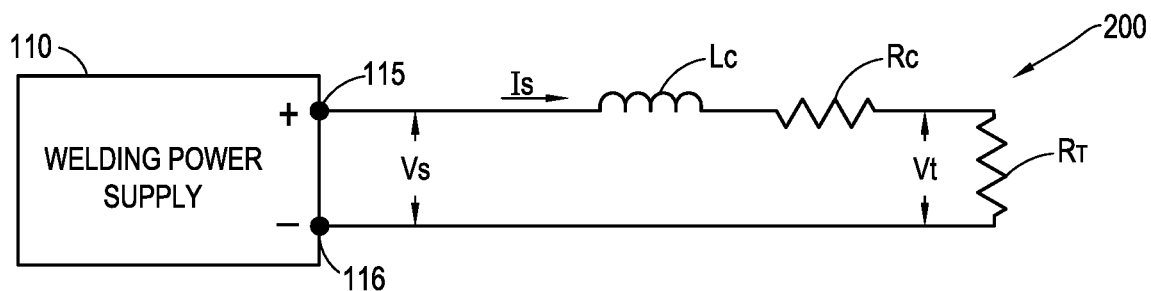
FIG. 4 is a schematic diagram of a welding circuit.

FIG. 4 shows a schematic diagram of a welding circuit 200. The welding circuit 200 extends from the output studs 115, 116 of the power supply 110 to the torch and workpiece (not shown). The power supply 110 can measure the welding current $I_S$ in the welding circuit 200, and the output voltage of the welding waveform $V_S$ across the output studs 115, 116, using the current and voltage sensors in the power supply. The resistance $R_T$ is the resistance at the torch and workpiece, and the voltage $V_T$ is the voltage between the torch and the workpiece. During an arc condition, $V_T$ is relatively high. However, during a short circuit condition between the wire electrode and the workpiece, $V_T$ is nearly 0V and is merely the voltage drop across the wire electrode that is shorted to the workpiece.

The inductance $L_C$ is the welding circuit inductance, which includes the variable cable inductance and also inductances in the power supply. The resistance $R_C$ is primarily the resistance of the welding cable and the resistance of the return or ground path, which may be through the welding cable or through another return path (e.g., earth ground). The inductance $L_C$ and resistance $R_C$ will increase with cable length, and $L_C$ can change with cable orientation (e.g., coiled, uncoiled, etc.) Circuit capacitance, or capacitive reactance, can generally be ignored as an insignificant contributor to the overall circuit impedance. When the cable length is short, the measurement of $V_S$ at the power supply 110 can provide useful information about conditions at the workpiece, such as whether a short between the welding electrode and workpiece is about to occur or clear. However, with long cable lengths and high cable inductances (e.g., 35 μH or greater), the impedance of the cable dominates the welding circuit, and certain conditions at the workpiece could not conventionally be accurately derived from $V_S$ and/or $I_S$. Thus, dedicated sense leads have been used by the power supply 110 to monitor $V_T$ more directly, but the use of sense leads is generally undesirable for various reasons discussed above.

The power supply 110, and in particular its controller, is configured to remotely determine conditions at the workpiece by monitoring the welding current $I_S$ and the voltage $V_S$ across the output studs 115, 116. The controller can calculate the impedance of the welding circuit, $Z_S$, in real time during a welding operation from the equation: $Z_S=V_S/I_S$. $Z_S$ is the sum of individual impedances in the welding circuit, including an inductive reactance $X_C$ due to the cable inductance $L_C$, the cable resistance $R_C$, and the resistance at the torch/workpiece $R_T$. Thus, $Z_S=X_C+R_C+R_T$. The inductive reactance, $X_C$, is equal to the cable inductance times the rate of change of the welding current $I_S$ divided by $I_S$: $X_C=(L_C)(dI_S/dt)/I_S$. Substituting for $X_C$ in the welding circuit impedance equation yields: $Z_S=(L_C)(dI_S/dt)/I_S+R_C+R_T$. Thus, the resistance at the torch/workpiece, $R_T$, can be calculated using the following equation: $R_T=Z_S-(L_C)(dI_S/dt)/I_S-R_C$. Further, replacing $Z_S$ with $V_S/I_S$ provides the following: $R_T=V_S/I_S-(L_C)(dI_S/dt)/I_S-R_C$. The calculated resistance at the torch/workpiece $R_T$ can be considered a "compensated resistance" because the impact of the cable impedance is compensated for.

Figure 5:
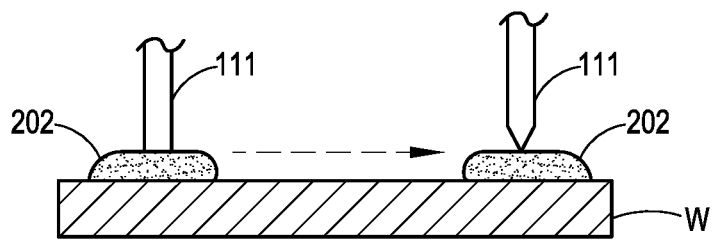
FIG. 5 illustrates a welding electrode and workpiece.

Knowing the resistance $R_T$ at the torch/workpiece in real time and/or monitoring its changes in real time during welding can provide the welding power supply 110 with important feedback information about what is occurring at the welding electrode. For example, as a short circuit between the welding electrode 111 and the workpiece W is about to clear or break, the electrode exhibits necking or narrowing at the molten weld puddle 202 (FIG. 5). The narrowing of the electrode results in the resistance $R_T$ rising. Monitoring the change in $R_T$ (e.g., $\Delta R_T$) can allow the power supply 110 to determine when the short is about to clear, and reduce the welding current (e.g., by deactivating the output switch 182—FIG. 3), to minimize spatter when the short breaks and an arc reignites. Monitoring $R_T$ and/or $\Delta R_T$ can also provide the welding power supply 110 with information about changes to electrode stickout, which can be useful when performing through-arc seam tracking. Monitoring $R_T$ and/or $\Delta R_T$ can also provide the welding power supply 110 with information about the amount of power or energy delivered to the workpiece, from which weld quality may be determined.

As noted above, $R_T$ can be calculated or estimated using the following equation: $R_T=V_S/I_S-(L_C)(dI_S/dt)/I_S-R_C$. The power supply 110 can monitor $V_S$ and $I_S$ in real time. To estimate the circuit inductance $L_C$, the power supply can monitor $V_S$ while the current is changed in a controlled fashion from a first level to a second level different from the first level. The controlled current change can be a generally linear ramp, or a nonlinear change (e.g., an exponential current change). The controlled current change from the first level to the second level can be either positive (e.g., an increasing current) or negative (e.g., a decreasing current). Further, the controlled current change from the first level to the second level can occur while the electrode 111 shorted to the workpiece W. The linear or nonlinear current ramping can be an upward ramp or a downward, decaying ramp, and may occur during active welding or during a weld cable test prior to welding. In certain embodiments, the inductance $L_C$ can be determined repeatedly during welding (e.g., in real time) to account for changes to the circuit inductance over time, due to the welding cable becoming coiled for example. The cable resistance $R_C$ can also be measured during active welding, or during a weld cable test, with the electrode 111 shorted to the workpiece, when the current $I_S$ is constant (e.g., $dI_S/dt=0$ to minimize the reactive impedance). The circuit inductance $L_C$ and resistance $R_C$ are preferably measured when the electrode 111 is known to not be necking or narrowing, during a solid short, to provide a baseline circuit impedance. The circuit inductance $L_C$ and resistance $R_C$ can be measured with the electrode 111 shorted to the workpiece W so that a voltage drop across an electrical arc at the workpiece is eliminated. However, it is to be appreciated that such measurements could be made at other points in time during welding, such as when a short is clearing and the welding current is intentionally rapidly reduced to minimize spatter, or when a pulse current is applied to reestablish an arc following a short circuit event. Either of these events (e.g., rapidly reducing the current or applying a current pulse) will include a high magnitude $dI_S/dt$, which is convenient for calculating the circuit inductance $L_C$. The circuit inductance $L_C$ and/or resistance $R_C$ can be measured during previous deposition operations and saved in a memory for use during a subsequent deposition operation, and the values of $L_C$ and $R_C$ can be updated from time to time as necessary.

In certain embodiments, the effect of the cable resistance $R_C$ on the calculation of $R_T$ can be approximated by a calibration variable CV. The calibration variable can be determined empirically and can be stored in a memory of the power supply 110. If a calibration variable is used, the equation for calculating $R_T$ will be as follows: $R_T = Z_S - X_C - CV = V_S/I_S - (L_C)(dI_S/dt)/I_S CV$.

Figure 6:
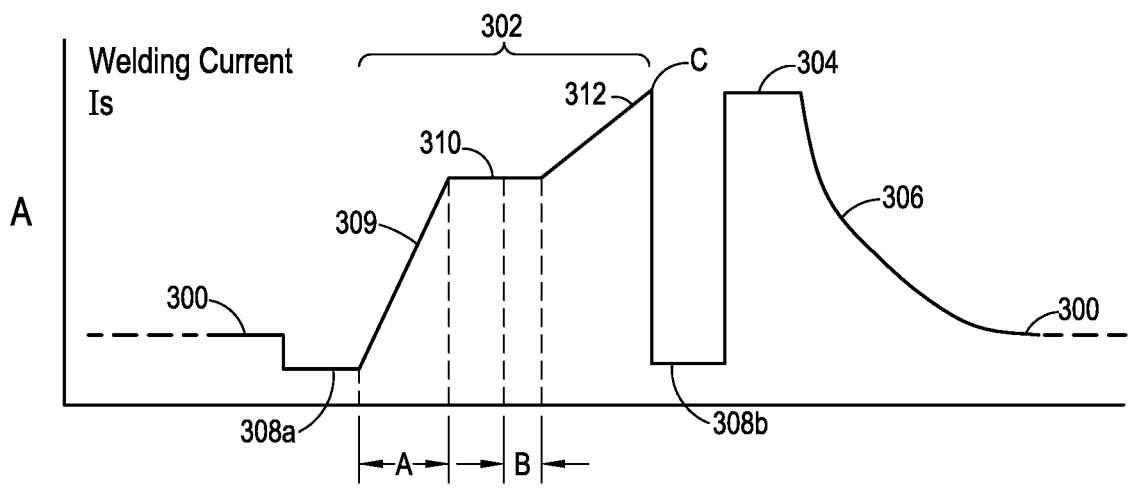
FIG. 6 illustrates a welding waveform.

An example calculation and use of the compensated resistance $R_T$ will be discussed in the context of an STT welding operation. A waveform suitable for STT welding is shown in FIG. 6, and will be discussed with respect to system components shown in FIG. 3. The waveform includes a background current portion 300, a pinch current portion 302, and a plasma boost pulse 304 followed by a tail out 306 to another background current portion 300. Between the background current portion 300 and the pinch current portion 302, and between the pinch current portion 302 and the plasma boost pulse 304, are minimum current portions 308a, 308b. It can be seen that the background current portion 300 has a greater magnitude than the minimum current portions 308a, 308b, but less than the pinch current portion 302 and the plasma boost pulse 304. The output switch 182 is in the on state during the background current 300, pinch current 302 and plasma boost pulse 304 portions of the welding waveform, and the welding current flows through the output switch during these portions. The output switch 182 is in the off state during the minimum current portions 308a, 308b, and the welding current flows through the resistor 170 during the minimum current portions. The magnitude of the minimum current portions 308a, 308b is determined by the resistance level of the resistor 170. An example current range for the background current portion 300 is 15 A to 150 A. An example current range for the pinch current portion 302 and the plasma boost pulse 304 is 150 A to 500 A. An example current range for the minimum current portions 308a, 308b is 20 A to 125 A.

During the background current portion 300, a molten ball forms on the end of the electrode 111, and the electrode can short to the weld puddle on the workpiece W. The controller 184 can recognize the existence of the short by monitoring the welding voltage $V_S$. When a short is detected, the controller implements first the minimum current portion 308a and quickly reduces the welding current to the minimum current level 308a by turning off the output switch 182. Reducing the welding current helps to ensure a solid short and avoids blowing apart the electrode like a fuse. After the first minimum current portion 308a and during a solid short between the electrode and workpiece, a pinch current 302 is applied through the output switch 182 to neck down the end of the electrode 111 for separation into the weld puddle. Just before the short is cleared, at point C on the waveform, the controller 182 again turns off the output switch 182 to implement the second minimum current portion 308b and quickly reduces the welding current to the low current level to prevent spatter when the molten ball pinches off of the electrode. When the arc is reestablished, the controller 184 applies a peak current or plasma boost pulse 304 through the output switch 182, to set the proper arc length and push the weld puddle away from the wire electrode 111. The plasma boost pulse 304 is then tailed out 306 by the controller 184, to return the welding current to the background current 300 level.

At point C on the waveform, the molten ball is about to pinch off from the electrode 111, and the electrode is necking as shown in FIG. 5. The reduced cross-sectional area across the electrode 111 due to the necking causes the resistance $R_T$ at the torch to rise. By monitoring the change in value of $R_T$ (e.g., $\Delta R_T$) in real time, from a point prior in time to necking of the electrode 111 until point C, the controller 184 can determine when pinch off is about to occur and when the short circuit event will clear. When the controller 184 determines that pinch off is about to occur, based on the increased resistance of $R_T$, it deactivates the output switch 182 to reduce the current to the minimum current level 308b. In certain embodiments, the change in value of $R_T$, $\Delta R_T$, can be compared to a threshold value to determine when pinch off is about to occur such that when $\Delta R_T$ meets or exceeds the threshold, the controller 184 deactivates the output switch 182. The threshold value of $\Delta R_T$ is indicative of the molten ball about to pinch off from the electrode 111, and can be determined empirically and be stored in a memory of the power supply 110. Example ranges for the threshold value of $\Delta R_T$ are 1-10 mohm, 2-5 mohm, etc., however, other ranges are possible and can be determined empirically.

In conventional STT welding, the pinch current portion of the welding waveform is a substantially linear current ramp from a first current level to a second current level. However, the pinch current portion 302 of the waveform in FIG. 6 is configured to allow the circuit inductance $L_C$ and baseline circuit resistance $R_C$ to be determined in real time during welding based on voltage and/or current measurements made while the welding electrode is solidly shorted to the workpiece. The real time circuit inductance $L_C$ and resistance $R_C$ measurements can then be used to calculate the compensated resistance $R_T$ of the electrode at the workpiece during a final current ramp of the pinch current portion 302 while the electrode necks down. The pinch current portion 302 has a first linear ramp 309 (period A) that provides a controlled change in current level (e.g., from a first level to a second level) at constant rate of change of the current ($dI_S/dt$). The circuit inductance $L_C$ can be calculated during the first linear ramp 309 from the output voltage of the welding waveform measured at the power supply and the change in current. The first linear ramp 309 is followed by a constant current portion 310 during which the reactive impedance due to circuit inductance is minimized. The cable or baseline circuit resistance $R_C$ can be calculated during the constant current portion 310 of the pinch current 302 (e.g., during period B). During the first linear ramp 309 and constant current portion 310 of the pinch current 302, the electrode is heated but has not yet pinched off or necked down significantly. Pinching occurs during a second ramp 312, which can have the same slope as the first linear ramp 309 or a different slope. The controller 184 monitors the change in the value of $R_T$ ($\Delta R_T$) during the second ramp 312, from a baseline or offset resistance $R_C$ measured during the constant current portion 310, to predict when the molten ball is about to pinch off, in order to properly time the deactivation of the output switch 182 and quickly reduce the welding current $I_S$. Conventionally, operation of the output switch 182 was based on the rate of change of voltage at the workpiece determined using sense leads or communicated by the wire feeder. However, monitoring changes in the compensated resistance $R_T$ as described above and operating the output switch 182 based thereon eliminates the need for the additional sense leads and communications from the wire feeder. It is to be appreciated that the circuit inductance $L_C$ can be determined from portions of the welding waveform other than the pinch current portion 302. For example, the circuit inductance $L_C$ can be determined from the decrease in current from end of the pinch current portion (point C) to the minimum current portion 308b, or from the increase in current from the end of the minimum current portion 308b to the plasma boost pulse 304. Further, the circuit inductance $L_C$ can be determined from the energy applied during welding and the welding current, while the current is increased/decreased linearly or nonlinearly.

Figure 7:
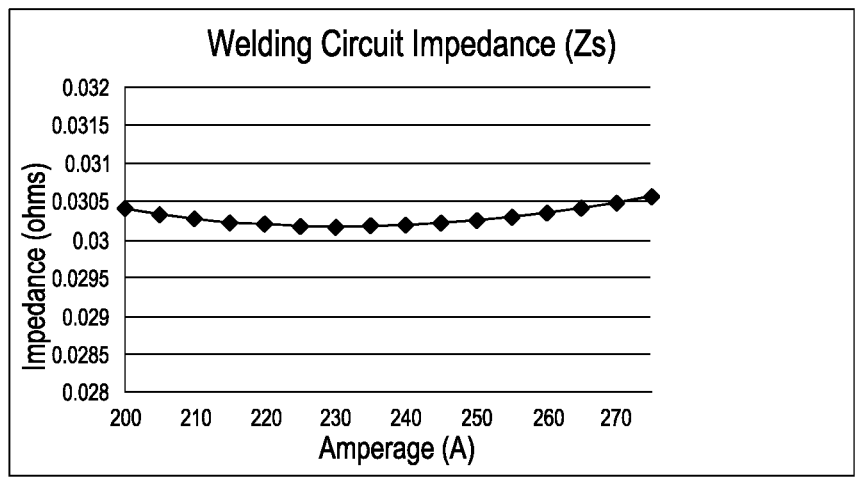
FIG. 7 is a graph of welding circuit impedance.
Figure 8:
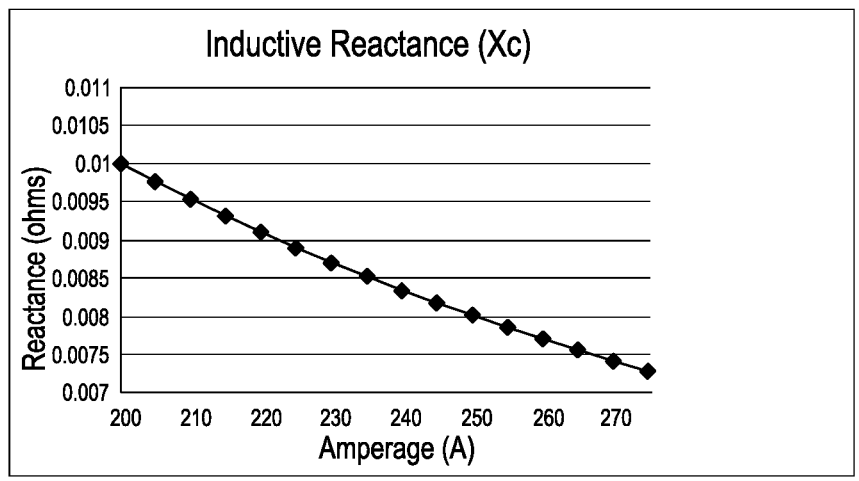
FIG. 8 is a graph of inductive reactance.
Figure 9:
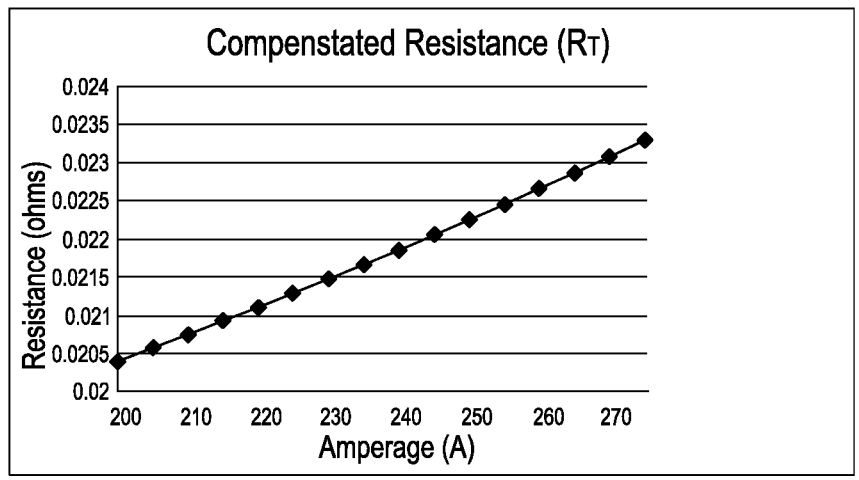
FIG. 9 is a graph of compensated resistance.

FIGS. 7-9 graphically show how the impedance of the welding circuit $Z_S$ as measured at the welding power supply, the inductive reactance of the welding circuit $X_C$, and the compensated resistance $R_T$ behave while the electrode is necking during pinch off. The behavior occurs during the second ramp 312 portion of the example current waveform shown in FIG. 6, as the power supply monitors $\Delta R_T$ to determine the impending pinch off of the molten ball from the electrode. It can be seen in FIG. 7 that the impedance $Z_S$ remains relative stable while the current $I_S$ is ramped upward to pinch off the molten ball. Thus, $Z_S$ alone does not provide a good indication of the impending separation of the molten ball. The inductive reactance $X_C$ (FIG. 8) is sloped linearly downward as the current $I_S$ is ramped upward. Because $X_C=(L_C)(dI_S/dt)/I_S$, when $I_S$ ramped upward during the second ramp 312 portion, the inductive reactance $X_C$ decreases linearly. The compensated resistance $R_T$ increases generally linearly while the electrode is necking, as shown in FIG. 9. By monitoring the change in $R_T$, the power supply can predict when the molten ball will pinch off and respond accordingly by reducing the welding current.

Figure 10:
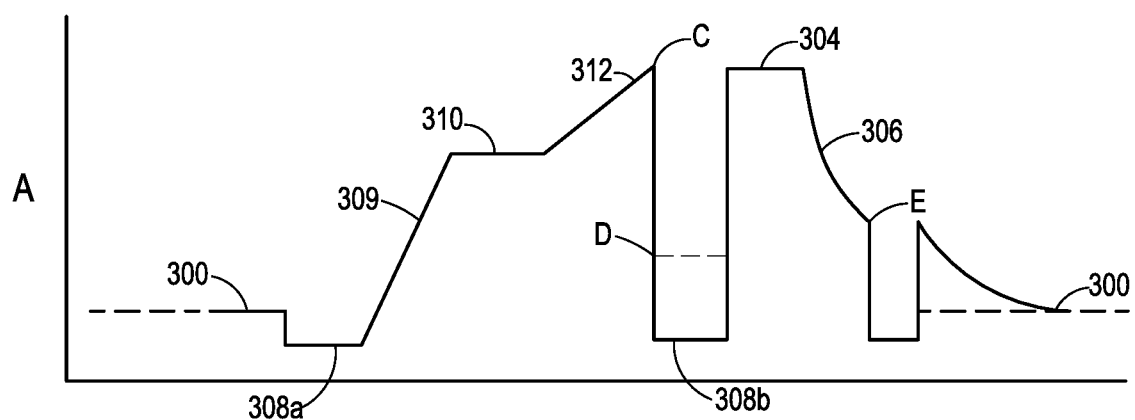
FIG. 10 illustrates a welding waveform.

FIG. 10 shows an example welding waveform similar to FIG. 6. As the welding cable length and inductance level of the welding circuit increases, the ability of the power supply to accurately determine when the molten ball will pinch off from the electrode can decrease. That is, the power supply's determination of the compensated resistance $R_T$ can become less accurate with increasing cable length/inductance. Under normal conditions wherein the compensated resistance $R_T$ can be accurately determined, the power supply will deactivate the output switch 182 (FIG. 3) for a period of time to allow the arc to reestablish. However, if the output switch 182 is deactivated too early (e.g., due to an inaccurate calculation of $R_T$), before the molten ball is ready to detach, it may not detach properly, which can result in electrode stubbing. The power supply is more likely to deactivate the output switch 182 too early when the cable inductance and circuit inductance $L_C$ are large because its determination of the compensated resistance $R_T$ is less accurate. To account for the possibility that the calculation of $R_T$ is not accurate, and that the output switch 182 will be deactivated too early, before the molten ball is ready to pinch off, the power supply can reactivate or turn on the output switch 182 sooner than it normally would. This will increase the welding current during pinch off, which may result in more spatter, but it will help to ensure separation of the molten ball and prevent stubbing of the electrode. In an example embodiment, the power supply compares the measured or estimated circuit inductance $L_C$ to a threshold level or value (e.g., 35 µH, 40 µH, 50 µH, greater than 50 µH, etc.) When the circuit inductance $L_C$ meets or exceeds the threshold, the power supply reactivates the output switch 182 when a predetermined current level D below the pinch current is reached, after deactivating the output switch at point C. The predetermined current level D is higher than the level of the minimum current portion 308b that is normally delivered to the welding electrode while the short circuit clears. An example current range for the predetermined current level D is 40 A to 125 A. When the welding current drops to the predetermined current level D, the power supply reactivates the output switch 182 and controls the welding current. The predetermined current level D can be a level sufficient to clear the short and can be determined empirically. The power supply can control the welding current to maintain a constant level (e.g., level D), or be ramped (e.g., ramped downward), prior to applying the plasma boost pulse 304.

Occasionally during the tail out 306, a very brief short circuit between the electrode and the workpiece can occur, which quickly clears. The power supply may recognize the existence of the short circuit and improperly deactivate the output switch 182 to reduce the current. This is shown at point E in FIG. 10, wherein the output switch has been deactivated and the current level reduced. Because the short occurred during the tail out 306 to the background current portion 300, after the output switch is reactivated, the power supply would tend to control the current to the background level 300. However, in such a scenario, less energy and heat are delivered to the electrode during the tail out 306 and background current 300 portions than is desired (which can result in poor droplet separation), because a portion of the tail out has been removed. To address this problem, the power supply (e.g., the controller) can include a buffer that stores a running memory of the current level. The running memory can be any length of time as desired, such as from less than a second to several minutes, for example. The power supply can then return to a previous current level stored in the running memory, after the output switch is reactivated, as shown in FIG. 10. Returning to the current level that was reached prior to deactivation of the output switch can result in slightly extending the length of the tail out 306 and background portion 300 for one period of the waveform. Various parameters can be stored in a running memory of the power supply, such as voltage, power, impedance, compensated resistance, etc.

Determining electrode necking and molten ball pinch off is just one example application of the above-discussed measurements and calculations concerning welding circuit impedances. The compensated resistance $R_T$ could also be used to determine changes in electrode stickout, such as when automatically seam tracking during welding. The welding electrode has a substantially smaller cross section, and can have a higher resistance, than the welding cables. The resistance of the welding electrode will decrease as the stickout decreases. Monitoring changes to electrode stickout using the compensated resistance $R_T$ can help to improve the accuracy of seam tracking, or any other process that is based on stickout or during which stickout is monitored. Analyzing the compensated resistance $R_T$ can also provide information about the amount of power or energy delivered to the workpiece, from which weld quality may be determined. The weld quality could be further classified according to the shielding gas mixture used during welding. For example, if the resistance or impedance of the welding circuit is outside of an acceptable range for a given electrode, gas and contact tip to work distance (CTWD), an appropriate alarm could be generated or the weld flagged as being out of specification. The measured circuit inductance and resistance (e.g., baseline circuit resistance and/or compensated resistance) could be used to automatically make adjustments to welding parameters, such as the welding voltage, or to generate alarms or other warnings. As noted above, a "trim" setting of the power supply can be adjusted based on the cable resistance. The trim setting is an overall voltage adjustment to control arc length. When the welding cable resistance is high, the power supply can increase the trim to accommodate the increased voltage drop across the weld cables. The welding power supply could include a lookup table that relates cable resistance and welding current to trim values, to automatically adjust the trim setting to an appropriate value for the current welding system setup.

Figure 11:
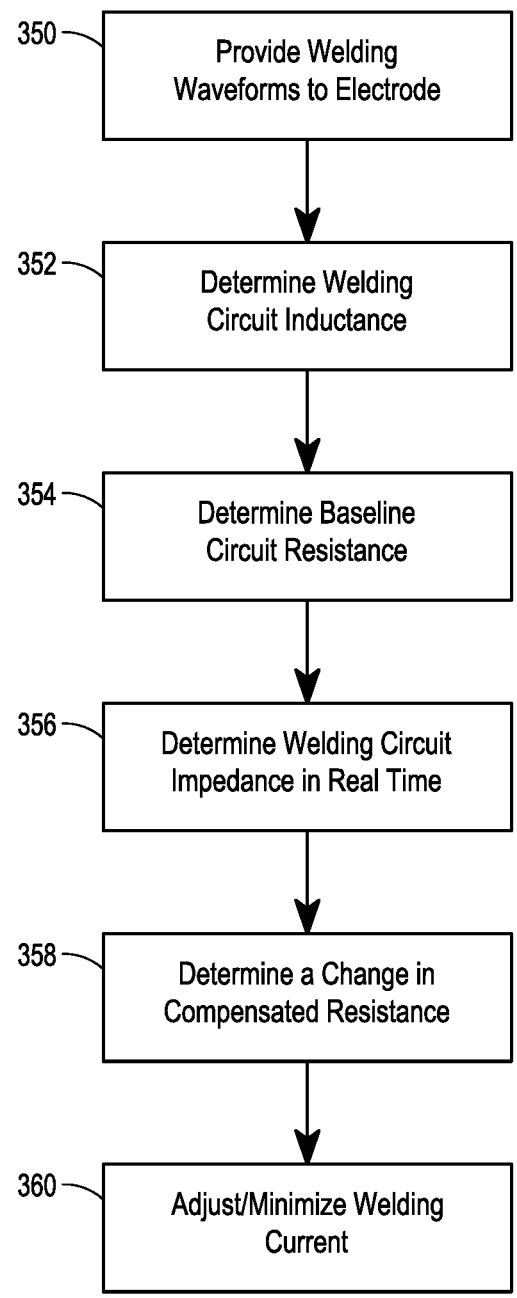
FIG. 11 is a flow diagram.

FIG. 11 is a flow diagram of an example process performed by a welding power supply. In step 350, the power supply provides a series of welding waveforms to a consumable electrode. From data obtained prior to or during the provision of the welding waveforms to the electrode, the power supply determines a circuit inductance of a welding circuit (step 352). The circuit inductance determination can be based on voltage and current measurements made while the current level through the electrode is changed in a controlled manner. The power supply further determines a baseline resistance of the welding circuit (step 354). The resistance determination can be based on voltage and current measurements made while the current level through the electrode is held constant and the electrode is shorted to the workpiece. The inductance and resistance measurements can be made in real time during a welding or other deposition operation. The power supply can further determine an impedance of the welding circuit in real time from voltage and current measurements made during the deposition operation (step 356). From the impedance of the welding circuit, real time voltage and current measurements, the circuit inductance and the baseline resistance, the power supply can determine a change in a compensated resistance (e.g., due to electrode necking) in the welding circuit in real time (step 358). For example, the power supply can transform the total impedance of the welding circuit into a compensated resistance. Based on the change in the compensated resistance, the power supply recognize that a short circuit condition is about to clear and can control operations of an output switch to reduce/minimize the welding current and minimize spatter during the deposition operation (step 360).

Figure 12:
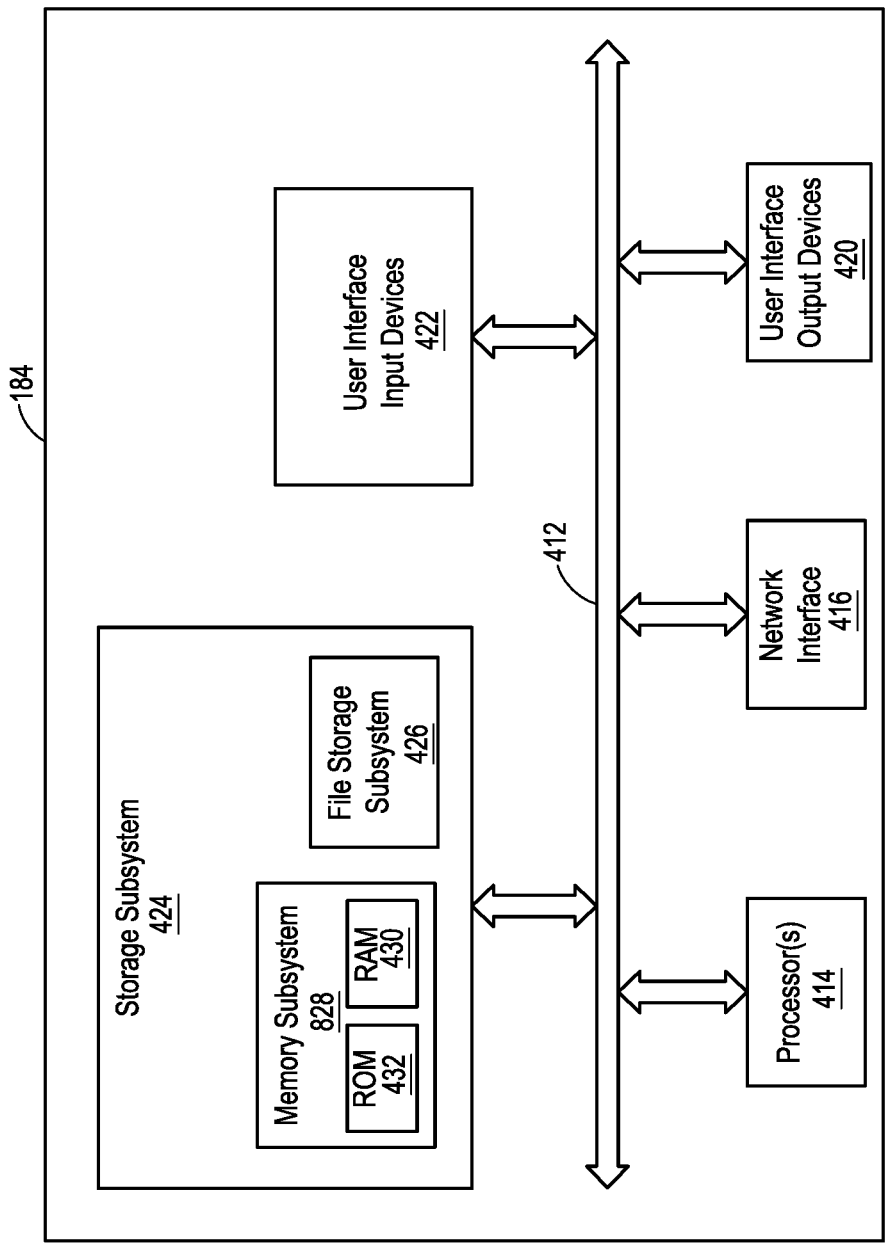
FIG. 12 illustrates an example controller.

FIG. 12 illustrates an embodiment of an example controller 184 of the welding power supply. The controller 184 includes at least one processor 414 which communicates with a number of peripheral devices via bus subsystem 412. These peripheral devices may include a storage subsystem 424, including, for example, a memory subsystem 428 and a file storage subsystem 426, user interface input devices 422, user interface output devices 420, and a network interface subsystem 416. The input and output devices allow user interaction with the controller 184. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices.

In general, use of the term "input device" is intended to include all possible types of devices and ways to input information into the controller 184 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 184 to the user or to another machine or computer system.

Storage subsystem 424 provides a non-transitory, computer-readable storage medium that stores programming and data constructs that provide the functionality of some or all of the control algorithms and software modules described herein. These software modules are generally executed by processor 414 alone or in combination with other processors. Memory 428 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 426 in the storage subsystem 424, or in other machines accessible by the processor(s) 414.

Bus subsystem 412 provides a mechanism for letting the various components and subsystems of the controller 184 communicate with each other as intended. Although bus subsystem 412 is shown schematically as a single bus, alternative embodiments of the bus subsystem may use multiple buses.

Many other configurations of the controller 184 are possible having more or fewer components than the controller depicted in FIG. 12.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding or additive manufacturing power supply, comprising:
output circuitry configured to generate a welding waveform, wherein the output circuitry includes at least one of an inverter and a DC chopper;
a current sensor for measuring a welding current generated by the output circuitry;
a voltage sensor for measuring an output voltage of the welding waveform; and
a controller operatively connected to the output circuitry to control the welding waveform, and operatively connected to the current sensor and the voltage sensor to monitor the welding current and the output voltage,
wherein a portion of welding waveform includes a controlled change in current, from a first level to a second level different from the first level, during a short circuit event between a consumable wire electrode and a workpiece, and wherein the controller is configured to calculate a circuit inductance value that includes a variable cable inductance level from the output voltage and the controlled change in current, and further calculate a change in resistance of the consumable wire electrode in real time from the circuit inductance value.

2. The welding or additive manufacturing power supply of claim 1, wherein the controller is configured to determine a circuit impedance in real time from the welding current and the output voltage.

3. The welding or additive manufacturing power supply of claim 1, wherein the controlled change in current occurs during a current ramp portion of the welding waveform.

4. The welding or additive manufacturing power supply of claim 1, wherein the controller is configured to determine clearance of the short circuit event based on the calculated change in resistance of the consumable wire electrode.

5. The welding or additive manufacturing power supply of claim 1, wherein the controller is configured to determine a change in electrode stickout distance based on the calculated change in resistance of the consumable wire electrode.

6. The welding or additive manufacturing power supply of claim 1, further comprising:
an output switch; and
a resistor connected in parallel with the output switch,
wherein the welding waveform includes a minimum current portion, a pinch current portion during the short circuit event between the consumable wire electrode and the workpiece, a plasma boost pulse portion, and a tail out from the plasma boost pulse portion to a background current level, and
wherein the controller is operatively connected to the output switch and is configured to deactivate the output switch to implement the minimum current portion of the welding waveform based on the calculated change in resistance of the consumable wire electrode.

7. The welding or additive manufacturing power supply of claim 6, wherein the controller is configured to compare the calculated change in resistance of the consumable wire electrode to a threshold value and deactivate the output switch when the calculated change in resistance of the consumable wire electrode meets or exceeds the threshold value.

8. The welding or additive manufacturing power supply of claim 6, wherein the controller is configured to compare the circuit inductance value to a threshold value and control reactivation of the output switch based on a result of comparing the circuit inductance value to the threshold value.

9. The welding or additive manufacturing power supply of claim 6, wherein the pinch current portion includes a constant current portion that minimizes reactive impedance, and wherein the controller calculates a baseline circuit resistance from the constant current portion during minimized reactive impedance.

10. The welding or additive manufacturing power supply of claim 1, wherein the controller is configured to adjust a welding current ramp rate based on the circuit inductance value.

11. A welding or additive manufacturing system, comprising:
a consumable wire electrode;
a torch;
a wire feeder that advances the consumable wire electrode through the torch during a deposition operation; and
a power supply operatively connected to the wire feeder and the torch through at least one cable,
wherein the power supply is configured to provide a series of welding waveforms to the torch to generate a welding current in the consumable wire electrode, wherein a portion of an individual welding waveform of said series of welding waveforms includes a controlled change in current from a first level to a second level different from the first level during a short circuit event between the consumable wire electrode and a workpiece, and wherein the power supply is configured to calculate a circuit inductance value that includes a variable inductance level of the at least one cable from voltage and current measurements made during the controlled change in current, and
wherein the power supply is further configured to calculate a change in resistance of the consumable wire electrode in real time from the circuit inductance value.

12. The welding or additive manufacturing system of claim 11, wherein the power supply includes a current sensor for measuring the welding current, and a voltage sensor for measuring an output voltage of the power supply, and wherein the power supply is configured to determine a circuit impedance in real time from the welding current and the output voltage.

13. The welding or additive manufacturing system of claim 11, wherein the controlled change in current occurs during a current ramp portion of the individual welding waveform.

14. The welding or additive manufacturing system of claim 11, wherein the power supply is configured to determine clearance of the short circuit event based on the calculated change in resistance of the consumable wire electrode.

15. The welding or additive manufacturing system of claim 11, wherein the power supply is configured to determine a change in electrode stickout distance based on the calculated change in resistance of the consumable wire electrode.

16. The welding or additive manufacturing system of claim 11, wherein the power supply comprises:
an output switch; and
a resistor connected in parallel with the output switch,
wherein the individual welding waveform includes a minimum current portion, a pinch current portion during the short circuit event between the consumable wire electrode and the workpiece, a plasma boost pulse portion, and a tail out from the plasma boost pulse portion to a background current level, and the power supply is configured to deactivate the output switch based on the calculated change in resistance of the consumable wire electrode.

17. The welding or additive manufacturing system of claim 16, wherein the power supply is configured to compare the calculated change in resistance of the consumable wire electrode to a threshold value and deactivate the output switch when the calculated change in resistance of the consumable wire electrode meets or exceeds the threshold value.

18. The welding or additive manufacturing system of claim 16, wherein the power supply is configured to compare the circuit inductance value to a threshold value and control reactivation of the output switch based on a result of comparing the circuit inductance value to the threshold value.

19. The welding or additive manufacturing system of claim 16, wherein the pinch current portion includes a constant current portion that minimizes reactive impedance, and wherein the power supply calculates a baseline circuit resistance from the constant current portion during minimized reactive impedance.

20. The welding or additive manufacturing system of claim 11, wherein the power supply is configured to adjust a welding current ramp rate based on the circuit inductance value.

21. A welding or additive manufacturing power supply, comprising:
output circuitry configured to generate a welding waveform, wherein the output circuitry includes at least one of an inverter and a DC chopper;
a current sensor for measuring a welding current generated by the output circuitry;
a voltage sensor for measuring an output voltage of the welding waveform; and
a controller operatively connected to the output circuitry to control the welding waveform, and operatively connected to the current sensor and the voltage sensor to monitor the welding current and the output voltage,
wherein a portion of welding waveform includes a controlled change in current from a first level to a second level different from the first level, during a short circuit event between a consumable wire electrode and a workpiece, and wherein the controller is configured to calculate a circuit inductance value that includes a variable cable inductance level in real time during a deposition operation from at least the controlled change in current, and further calculate a change in resistance of the consumable wire electrode in real time from on the circuit inductance value.

22. The welding or additive manufacturing power supply of claim 21, wherein the controller is configured to determine a circuit impedance in real time from the welding current and the output voltage.

23. The welding or additive manufacturing power supply of claim 21, wherein the controlled change in current occurs during a current ramp portion of the welding waveform.

24. The welding or additive manufacturing power supply of claim 21, wherein the controller is configured to determine clearance of the short circuit event based on the calculated change in resistance of the consumable wire electrode.

25. The welding or additive manufacturing power supply of claim 21, wherein the controller is configured to determine a change in electrode stickout distance based on the calculated change in resistance of the consumable wire electrode.

26. The welding or additive manufacturing power supply of claim 21, further comprising:
an output switch; and
a resistor connected in parallel with the output switch,
wherein the welding waveform includes a minimum current portion, a pinch current portion during the short circuit event between the consumable wire electrode and the workpiece, a plasma boost pulse portion, and a tail out from the plasma boost pulse portion to a background current level, and
wherein the controller is operatively connected to the output switch and is configured to deactivate the output switch to implement the minimum current portion of the welding waveform based on the calculated change in resistance of the consumable wire electrode.

27. The welding or additive manufacturing power supply of claim 26, wherein the controller is configured to compare the calculated change in resistance of the consumable wire electrode to a threshold value and deactivate the output switch when the calculated change in resistance of the consumable wire electrode meets or exceeds the threshold value.

28. The welding or additive manufacturing power supply of claim 26, wherein the controller is configured to compare the circuit inductance value to a threshold value and control reactivation of the output switch based on a result of comparing the circuit inductance value to the threshold value.

29. The welding or additive manufacturing power supply of claim 26, wherein the pinch current portion includes a constant current portion that minimizes reactive impedance, and wherein the controller calculates a baseline circuit resistance from the constant current portion during minimized reactive impedance.

30. The welding or additive manufacturing power supply of claim 21, wherein the controller is configured to adjust a welding current ramp rate based on the circuit inductance value.

* * * * *